(12) United States Patent
Bhalavi et al.

(10) Patent No.: US 11,525,095 B2
(45) Date of Patent: Dec. 13, 2022

(54) PROCESS FOR MOLECULAR SEPARATION OF HYDROCARBONS USING NANOPORE MEMBRANES

(71) Applicant: Indian Oil Corporation Limited, Mumbai (IN)

(72) Inventors: Prakash Bhagwant Bhalavi, Faridabad (IN); Devotta Irudayaraj, Faridabad (IN); Naduhatty Selai Raman, Faridabad (IN); Alok Sharma, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/448,236

(22) Filed: Sep. 21, 2021

(65) Prior Publication Data

US 2022/0089959 A1 Mar. 24, 2022

(30) Foreign Application Priority Data

Sep. 23, 2020 (IN) .............................. 202021041222

(51) Int. Cl.
  *C10G 31/09* (2006.01)
  *B01D 61/36* (2006.01)
  *B01D 65/02* (2006.01)

(52) U.S. Cl.
  CPC ........... *C10G 31/09* (2013.01); *B01D 61/364* (2013.01); *B01D 65/02* (2013.01); *B01D 2311/25* (2013.01); *B01D 2313/18* (2013.01); *B01D 2313/243* (2013.01); *B01D 2321/16* (2013.01); *C10G 2300/104* (2013.01); *C10G 2300/1044* (2013.01); *C10G 2300/1051* (2013.01); *C10G 2300/202* (2013.01); *C10G 2300/205* (2013.01); *C10G 2300/206* (2013.01); *C10G 2300/301* (2013.01); *C10G 2300/4018* (2013.01)

(58) Field of Classification Search
  CPC .. B01D 2317/04; B01D 61/364; B01D 65/02; B01D 2311/25; B01D 2313/18; B01D 2313/243; B01D 2321/16; B01D 61/145; B01D 61/22; B01D 2311/06; B01D 2311/165; C10G 31/09; C10G 2300/104; C10G 2300/1044; C10G 2300/1051; C10G 2300/202; C10G 2300/205; C10G 2300/206; C10G 2300/301; C10G 2300/4018
  See application file for complete search history.

(56) References Cited

U.S. PATENT DOCUMENTS

| | | | |
|---|---|---|---|
| 2,958,656 A * | 11/1960 | Stuckey | B01D 61/364 585/818 |
| 4,797,200 A | 1/1989 | Osterhuber | |
| 5,785,860 A | 7/1998 | Smith | |
| 7,897,828 B2 | 3/2011 | Nadler et al. | |
| 8,177,965 B2 | 5/2012 | Leta et al. | |

* cited by examiner

*Primary Examiner* — Thuan D Dang
(74) *Attorney, Agent, or Firm* — Workman Nydegger

(57) ABSTRACT

The present invention relates to the process for molecular separation of hydrocarbons using nanopore membrane comprising passing the hydrocarbon feedstock with or without separation enhancing additive/additives to produce permeate streams having different refractive indices which resonate with that of naphtha, kerosene and heavier molecules.

11 Claims, 1 Drawing Sheet

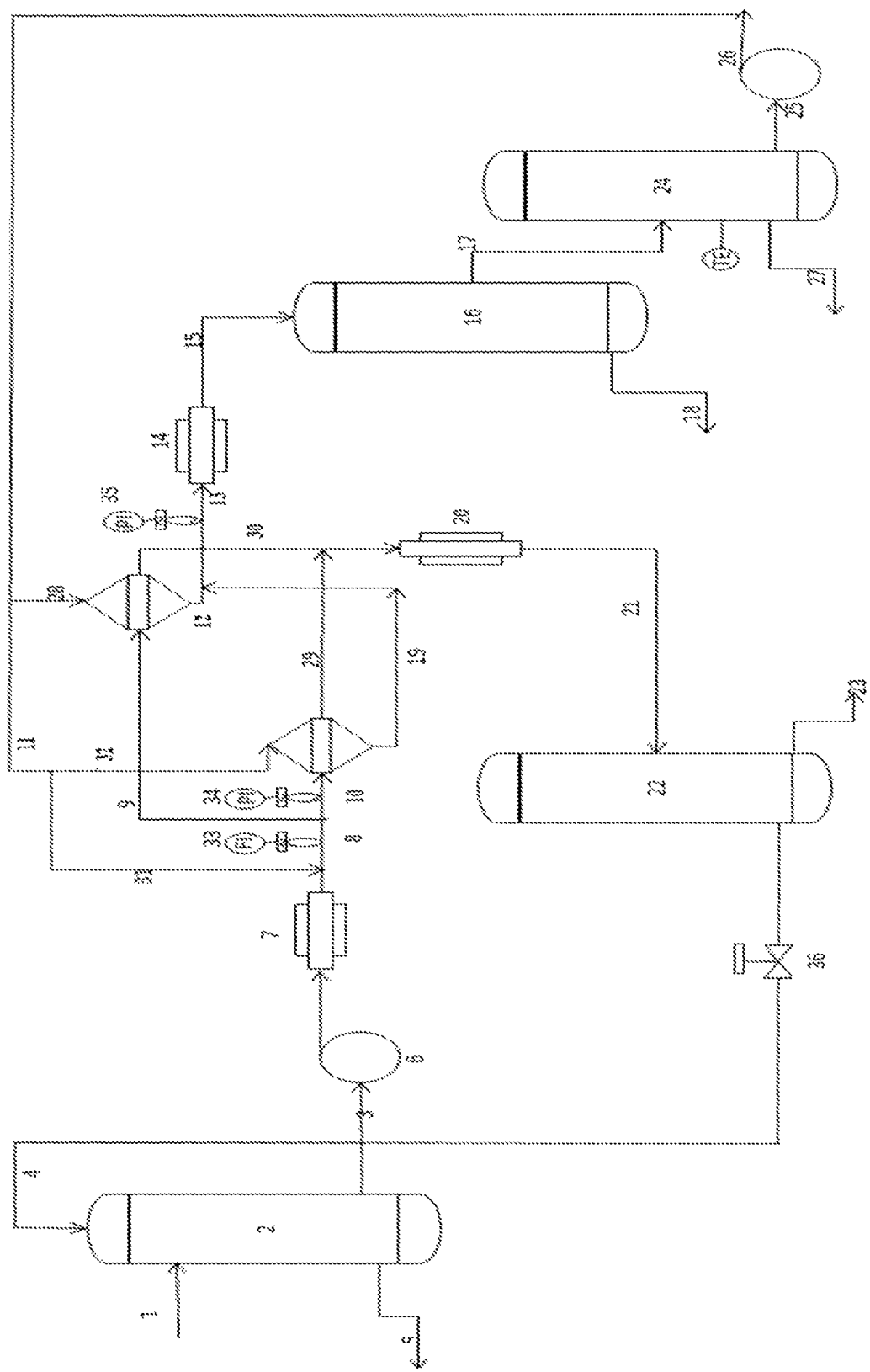

PROCESS FOR MOLECULAR SEPARATION OF HYDROCARBONS USING NANOPORE MEMBRANES

FIELD OF THE INVENTION

The present invention covers a process for molecular separation of hydrocarbon using nanopore membrane comprises passing the hydrocarbon feedstock with or without separation enhancing additive/additives to produce permeate stream of lighter molecular hydrocarbon and a retentate stream of heavier molecular hydrocarbon differentiated with their respective refractive indices.

BACKGROUND OF THE INVENTION

Hydrocarbon feedstock contains various amounts of organic and inorganic impurities. The organic impurities usually include asphaltenes, Conradson Carbon Residue (CCR), microcrystalline wax etc. Organic impurities can cause serious problems in distillation columns, transfer lines, tubing, pipelines and storage tanks. Various inorganic impurities in crude oil can be sediments and metals impurities (e.g., sodium-, potassium-, lead-, mercury-, and vanadium-containing compositions), which can corrode the equipment parts. Organic metals cause poisoning of catalysts in catalytic processes for treatment of crude oil fractions.

Generally, in conventional refineries the crude oil is first processed through distillation columns which distill lighter hydrocarbons from heavier hydrocarbons. Crude oil is first processed to atmospheric distillation unit to separate lighter and heavier hydrocarbons fractions from crude oil. The bottom or heaviest hydrocarbons of atmospheric distillation column is then fed to vacuum distillation unit where it is separated into further fractions. The bottom or heaviest hydrocarbons from the vacuum distillation columns which mainly contains organic and inorganic impurities are then processed through very expensive and energy intensive treatment like solvent extraction, solvent dewaxing, and solvent de-asphalting. Therefore, an energy efficient, eco-friendly and a much simpler process is sought for the separation of impurities and further improvement of hydrocarbon feedstock that will rise above the shortcomings of the conventional processes.

Varieties of processes to upgrade the hydrocarbons through membranes particularly heavy oil have been reported. In the U.S. Pat. No. 7,897,828, the process for separating heavy oil feed stream has been discussed, which uses ultrafiltration technology to upgrade heavy oil (vacuum resid from vacuum distillation column) by removing metals, but the present invention relates to a process for molecular separation of hydrocarbon using nanopore membrane comprises passing the hydrocarbon feedstock with or without separation enhancing additive/additives to produce permeate stream of lighter molecular hydrocarbon and a retentate stream of heavier molecular hydrocarbon, differentiated with their respective refractive indices.

In the U.S. Pat. No. 8,177,965, an ultrafiltration process comprising ceramic membrane for enhancement of saturate content in heavy hydrocarbons has been discussed, but the present invention relates to a process for molecular separation of hydrocarbon using nanopore membrane comprises passing the hydrocarbon feedstock with or without separation enhancing additive/additives to produce permeate stream of lighter molecular hydrocarbon and a retentate stream of heavier molecular hydrocarbon differentiated with their respective refractive indices.

The U.S. Pat. Nos. 5,785,860 and 4,797,200, claimed an ultrafiltration process of upgrading heavy oil comprising ceramic membrane and polymer respectively, but the present invention relates to a process for molecular separation of hydrocarbon using nanopore membrane comprises passing the hydrocarbon feedstock with or without separation enhancing additive/additives to produce permeate stream of lighter molecular hydrocarbon and a retentate stream of heavier molecular hydrocarbon differentiated with their respective refractive indices.

SUMMARY OF THE PRESENT INVENTION

The advancement over the prior arts is that the present invention discloses the process for molecular separation of hydrocarbon using nanopore membrane, which comprises passing the hydrocarbon feedstock with or without separation enhancing additive/additives to produce permeate stream of lighter molecular hydrocarbon and a retentate stream of heavier molecular hydrocarbon differentiated with their respective refractive indices.

BRIEF DESCRIPTION OF THE DRAWING

These and other features, aspects, and advantages of the present invention will become better understood when the following detailed description is read with reference to the accompanying drawings in which like characters represent like parts throughout the drawings wherein:

FIG. 1 illustrates a schematic showing the membrane process used in the experiments of the invented process.

DESCRIPTION OF THE INVENTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

The articles "a", "an" and "the" are used to refer to one or to more than one (i.e., to at least one) of the grammatical object of the article. The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of elements or steps but not the exclusion of any other element or step or group of elements or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference. The present disclosure is not to be limited in scope by the specific examples described herein, which are intended for the purposes of exemplification only. Functionally-equivalent products and methods are clearly within the scope of the disclosure, as described herein.

The terminology and structure employed herein is for describing, teaching and illuminating some embodiments and their specific features and elements and does not limit, restrict or reduce the spirit and scope of the invention.

According to the main embodiment, the present invention discloses a process for molecular separation of hydrocarbon, wherein said process comprises the steps of:

passing a hydrocarbon feedstock with/without a separation enhancing additive(s) through nanopore membranes to produce a permeate stream of lighter molecular hydrocarbon having boiling point below 330° C. and a retentate stream of heavier molecular hydrocarbon having boiling point above 550° C.;

measuring the refractive indices of the streams and accordingly differentiating said permeate stream and the retentate stream with respect to their respective refractive indices;

recovering a permeate stream that has 70-90% reduced asphaltenes, metals, sulfur and CCR compared to feed stream; and recycling the retentate stream having enriched impurities back for further purification until the recovery reaches to maximum;

wherein said permeate stream has lesser metals, sulfur and Conradson Carbon Residue while said retentate stream has higher metals, sulfur and Conradson Carbon Residue as compared to the feedstock and said process enables removal of inorganic and organic contaminants from the hydrocarbon feedstock in an energy-efficient and eco-friendly process.

The measuring of refractive indices is done during the passing of hydrocarbon feedstock through membrane.

In a detailed embodiment, the present invention provides a process for molecular separation through membranes in a such way that, the lighter molecules permeate faster than the heavier ones, wherein the naphtha molecules permeate faster than the diesel ones and the heavier molecules, indicating that distillation like separation is quite possible at lesser energy input and cost with eco-friendly manner.

It is based on using physical as well as chemical ways to channel the separation, physical separation involves passing a feed through nanopore inorganic, polymer or mixed matrix membrane until a less impurity permeate obtained. The permeate recovery and permeate quality are the essential parameter of process performance. The permeate is continuously collected and at a certain recovery value, the process is terminated and the impurities difference in terms of metals, CCR, sulfur, refractive index, is then determined to calculate the efficiency and the separation of the process.

The flux and selectivity depend upon the pore size of the membrane. The kinetic diameter is an indication of the size of the molecule as a target and also determines the overall permeability of the molecule. Lower the kinetic diameter, better the permeation of the molecule. Since the kinetic diameter of hydrocarbon increases with the carbon number in the hydrocarbons, the lighter molecules permeates quickly than the higher carbon molecules, the data of kinetic diameter with respect to carbon number is given in the Table 1 and therefore, the permeate stream initially contains most of the lighter hydrocarbon molecules and at the end contains the heavier molecules which are equivalent to gas oil and heavier fractions of hydrocarbon molecules.

In an embodiment, passing a hydrocarbon feedstock with/without a separation enhancing additive(s) through nanopore membranes to produce a permeate stream of lighter molecular hydrocarbon and a retentate stream of heavier molecular hydrocarbon include the steps of:

adding hydrocarbon feedstock (1) into a feed tank (2);

pumping said feed to membrane section by pump (6) via feed line (3);

heating said feed to operating temperature by a heater (7);

feeding said heated feed to membrane module (8) or (10) or both, the cleaner feed permeates through bottom side and goes to a permeate section through line (12) and (19) and the retentate through (29) and (30) goes to a retentate section where the retentate steam via line (29) goes to a heater (20) to maintain the operating temperature and fed to retentate tank (22) via line (21), the retentate stream again recycled back via line (4) to feed tank (2) which is controlled with a valve;

condensing lighter feed in condenser (14) in which the permeate stream comes through line (15);

feeding said condensed lighter feed to a permeate tank (16) and either charging said feed to a solvent tank (24) via line (17) or using fresh solvent for cleaning the membrane;

pumping the solvent stream (25) by pump (26) to membrane section by line (11) and passing it from there through both the membranes by line (31) and permeate side by line (32) and (28) to membranes (8) and (10) respectively;

monitoring the flow rate, velocity and density of feed by flow indicator (33) and pressure by Pressure indicators (34) and (35);

generating high cross flow velocity at high viscosity via the pump (6) and controlling the recycling line flow rate via the control valve (36);

recovering a permeate stream that is significantly reduced in asphaltenes, metals, sulfur and CCR; and recycling the retentate stream having enriched impurities back for further purification.

In another embodiment, a sampling point for characterization of streams is provided at the bottom of the tank as (5), (23), (18), (27) respectively for feed tank, retentate tank, permeate tank and solvent tank.

In yet another embodiment, the hydrocarbon feeds obtained through the process having American Petroleum Institute (API) gravity from 10 to 50, asphaltene content from 0.4 to 10%, sulfur content from 0.05 to 5% and metal like Nickel and Vanadium from 0.5 to 50 ppm level.

In one embodiment, the membranes have pore size ranging from 50-200 nm and most preferably in the range 100-200 nm.

In another embodiment, the separation enhancing additives are selected from the group of organic polyisocyanates containing aromatically bound isocyanate groups i.e. 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4 toluene diisocyanate, 2,6-toluene diisocyanate, mixtures of 2,4- and 2,6-toluene diisocyanate, hexahydrotoluene diisocyanate, and mixtures thereof.

In yet another embodiment, the separation enhancing additive reacts with asphaltenes molecules which has kinetic diameter generally in the range of 15-50 nm.

The separation enhancing additive reacts with active hydrogen atom (mainly —OH) present in the asphaltene micelle. The separation enhancing additive facilitates the agglomeration of asphaltenes molecules which further helps in separation of impurities. The additive forms adduct with asphaltenes. Thereby making them bigger and easing the separation of oil and asphaltenes.

In an embodiment, the concentration of metals, sulfur, asphalt concentration, Conradson Carbon residue and refractive index are reduced in the permeate stream by at least 30% of the hydrocarbon feedstock.

In another embodiment, the stream has Reynolds number inside the porous membrane element of at least 20000.

In yet another embodiment, across the porous membrane element, the transmembrane pressure is at least 6 bar.

In one more embodiment, the hydrocarbon feedstock stream temperature ranges from about 80 to about 300° C.

FIG. 1 is a schematic showing the membrane process used in the experiments underlying the invention.

The flux through the membrane in a spacer-filled channel is mainly influenced by the local transmembrane pressure (TMP), driving force and the effect of concentration polarization/fouling. According to the Darcy's law, the initial permeate rate can be determined by following equation:

$$J_w \approx \frac{V_p}{A_m dt} \approx \frac{\Delta P}{\mu R_T}$$

where $J_w$ is the volume flux (m/s), $A_m$ is the membrane cross-sectional area (m²), $V_p$ is the filtrate volume (ml) collected on the permeate side at a particular time interval (dt), $\Delta P$ is the applied transmembrane pressure (kPa), $\mu$ is the viscosity (Pa.s) of the permeate sample and $R_T$ is the total membrane resist stance (m⁻¹). $R_T$ is given by:

$$R_T = R_C + R_F + R_M$$

where $R_C$ is the cake layer resistance due to concentration polarization and the deposition of solids on the membrane surface, $R_F$ is the fouling layer resistance (m⁻¹) due to the internal fouling inside the pores and $R_M$ is the intrinsic membrane resistance.

The separation capability of membrane can be expressed in terms of rejection coefficient, R, as follows:

$$R = \left(1 - \frac{C_p}{C_f}\right)$$

where R is the membrane rejection of a component in a defined condition of pressure and feed concentration, while $C_p$ and $C_f$ are the concentration of the components in the permeate and feed stream respectively.

However, the concentration in the retentate and permeate streams depend not only on the membrane rejection but also on the recovery rate ($\Delta$) that is given by:

$$\Delta = \frac{V_p}{V_0}$$

where $V_p = V_p(t)$ and $V_0$ are the permeate volume and the initial feed volume, respectively and t is the time.

In an ideal situation i.e., pores are cylindrical, uniformly distributed, no fouling and negligible concentration polarization, the fluid flow through the porous membrane can be described by the Haugen-Poiseuille law;

$$J_w = \frac{\varepsilon d_p^2 P_T}{32 \Delta x \mu}$$

where $\varepsilon$ is the surface porosity of the membrane, $d_p$ is the mean pore diameter, $P_T$ is the applied transmembrane pressure, $\Delta x$ is the length of the channel, and $\mu$ is the viscosity of the fluid permeating the membrane. The Haugen-Poiseulle equation assumes the flow is laminar which means the Reynolds number (Re) is <2100 and the fluid is a Newtonian fluid.

$$Re = uL/v$$

In accordance with the invention, the hydrocarbon feed stock with or without separation enhancing additive is first heated and then pumped through a membrane unit at high transmembrane pressure using a cross flow manner. The conditions of the process are typically as follows: pore size 100 to about 200 nm, feed temperature typically varies from 30° C. to 300° C. or maximum temperature withstand by membrane, transmembrane pressure 7 bar to maximum allowable pressure of the membrane module, fluid velocity through membrane tube 1 to 6 m/s. Feed flow rate depends on total surface area of the membrane unit which is typically from 1 to 5 kg/hr. The processes can be carried out in continuous manner shown in FIG. 1 and as explained above.

The molecular separation of hydrocarbon feedstock can be monitored through rigorous analysis via refractive index. The refractive index of a component of a mixture is dependent upon the wavelength of the incident light corresponding to the sodium D lines. There is a specific refractive index for individual component and mixtures, by comparing refractive indices of standard mixtures or of single components, one can determine the trend in the mixture based on the deviation in the measurement. For hydrocarbon separation, the refractive index of major components and standard product like naphtha, kerosene is calculated. The approximate refractive indexes of some important organic compounds and products measured at 20° C. are given in the Table 1.

| Hydrocarbons | Boiling point | Kinetic Diameter (A0) | Refractive Index at 20° C. |
|---|---|---|---|
| n-pentane ($C_5H_{12}$) | 36.1 | 5.1 | 1.35746 |
| 2,3 DMB ($C_6H_{14}$) | 49.7 | 5.8 | 1.3688 |
| 223 TMB ($C_7H_{16}$) | 81.7 | 6.2 | 1.3892 |
| Iso-octane ($C_8H_{18}$) | 99 | 6.2 | 1.3916 |
| Nonane ($C_9H_{20}$) | 151 | 6.4 | 1.4203 |
| Decane ($C_{10}H_{22}$) | 174 | 6.7 | 1.4130 |
| Dodecane ($C_{12}H_{26}$) | 216 | 7.0 | 1.4216 |
| Naphtha | 30-200 C. | — | ~1.43323 |
| Kerosene | 150-300 | — | ~1.44844 |
| Heavier/gas oil | 270+ | — | >1.46693 |

The refractive index relation for hydrocarbons can be approximated by following relationship:

Refractive index=(dielectric constant)$^{0.5}$

The presence of asphaltenes and waxes in crude oil does not necessarily preclude refractive index measurement, and the refractive index can be correlated with other properties including the viscosity and the temperature below which solid deposition occurs ('cloud point').

The refractive index of iso-octane is 1.39 and values for naphtha cut would be somewhere close to it. One of the primary applications of optics to naphtha is the detection of contaminants from the higher boiling ranges. Such contaminants are usually from the kerosene boiling range; hence the naphtha refractive indices lie in the range of 1.4333. The increase in refractive index is also an indication of stream getting richer in terms of heavier molecule or in other words the higher carbon number molecules which is also evident with the increasing kinetic diameter of these molecules.

The refractive index of retentate at the end of the process as shown in the Examples 1, 2 and 3, indicates the presence of heavier molecules which are equivalent to vacuum residue along with traces of lower boiling components.

The permeate streams coming from the membrane process collected in a regular interval showed distinct features as compared to one another when characterized based on the refractive index parameter. The initial permeate stream collected during first few hours was similar to refractive index of the naphtha range and the stream afterwards resonates with the kerosene and heavier range refractive index. It shows that there has been a distinct molecular separation happening throughout the process which can be compared with the conventional distillation process where different products and molecules got separated on the basis of their boiling point. In the membrane process, the naphtha like stream is getting permeate in initial hours and then the heavier ones like kerosene or heavier fraction like stream get collected, this demonstrates that the membrane process could be the solution or alternative to replace conventional distillation process which a costly affair in terms of cost and energy involved.

Along with the refractive index, the metal concentrations, CCR, sulfur and the distillation data in these permeate batches prove that the different permeates collected in a regular interval are on par or better than the original crude data with respective boiling range. The naphtha, kerosene and heavier refractive index for crude is given in Examples 1, 2, and 3.

EXAMPLES

Example: 1

This example includes the results obtained from a hydrocarbon feedstock of API 47 with addition of separation enhancing additive. Total permeate recovery was 74% and conducted under the same conditions of process parameters throughout the runtime. The membrane used had an average pore diameter of 500 nm.

| | |
|---|---|
| Feed Temperature (° C.) | 140-150 |
| Feed Inlet Pressure (Bar) | 5-6 |
| FEED VELOCITY (m/s) | 3 |
| Pore Size (nm) | 500 |
| Additive dose (ppm) | 500 |
| Avg. Flux (kg/m²/hr) | 12 |
| Recovery (%) | 80 |
| Gasoline RI at 20° C. | 1.43323 |
| Kerosene RI at 20° C. | 1.44844 |
| Heavier RI at 20° C. | 1.46693 |

| | FEED | PERMEATE | RETENTATE |
|---|---|---|---|
| Asphaltene (%) | 0.63 | .081 | 1.77 |
| Ni (ppm) | <1 | <1 | <1 |
| V (ppm) | <1 | <1 | 3 |
| CCR (%) | 2.27 | 1.38 | 3.88 |
| Sulfur | 0.3 | 0.2 | 0.4 |
| RI | 1.51602 | 1.4975 | 1.53208 |

Example: 2

This example includes the results obtained from a hydrocarbon feedstock of API 12 with addition of separation enhancing additive. Total permeate recovery was 74% and conducted under the same conditions of process parameters throughout the runtime. The membrane used had an average pore diameter of 1000 nm.

| | |
|---|---|
| Feed Temperature (° C.) | 120-130 |
| Feed Inlet Pressure (Bar) | 20-25 |
| Feed Velocity (m/s) | 3 |
| Pore Size (nm) | 1000 |
| Additive dose (ppm) | 2000 |
| Avg. Flux (kg/m²/hr) | 6 |
| Recovery (%) | 74 |
| Gasoline RI at 20° C. | 1.43323 |
| Kerosene RI at 20° C. | 1.44844 |
| Heavier RI at 20° C. | 1.46693 |

| | FEED | PERMEATE | RETENTATE |
|---|---|---|---|
| Asphaltene (wt %) | 3.8 | 0.9 | 11.9 |
| Ni (ppm) | 10.2 | 1.2 | 38 |
| V (ppm) | 32.2 | 5.2 | 132 |
| CCR (%) | 6.96 | 2.269 | 19.4257 |
| Sulfur | 2.95 | 1.6 | 4.79 |
| RI | 1.50482 | 1.48890 | 1.56673 |

Example: 3

This example includes the results obtained from a hydrocarbon feedstock of API 30 with addition of separation enhancing additive. Total permeate recovery was 75% and conducted under the same conditions of process parameters throughout the runtime. The membrane used had an average pore diameter of 1000 nm.

| | |
|---|---|
| Feed Temperature (° C.) | 120-130 |
| Feed Inlet Pressure (Bar) | 24-27 |
| Feed Velocity (m/s) | 3 |
| Pore size (nm) | 1000 |
| Additive dose (ppm) | 2000 |
| Avg. Flux (kg/m²/hr) | 6 |
| Recovery (%) | 75 |
| Gncalinp RI nt 20° C. | 1 41461 |
| Kerosene RI at 20° C. | 1.46213 |
| Heavier RI at 20° C. | 1.48003 |

| | FEED | PERMEATE | RETENTATE |
|---|---|---|---|
| ASPHALTENE (wt %) | 4 | 0.8 | 13.8 |
| Ni (ppm) | 16 | 5 | 46 |
| V (ppm) | 60 | 19 | 173 |
| CCR (%) | 7.331 | 3.054 | 18.214 |

-continued

| | | | |
|---|---|---|---|
| Sulfur | 3.75 | 2.72 | 5.09 |
| RI | 1.50581 | 1.49362 | 1.56334 |

Example: 4

This example includes the results obtained from a hydrocarbon feedstock of API 12 without addition of separation enhancing additive. Total permeate recovery was 80% and conducted under the same conditions of process parameters throughout the runtime. The membrane used had an average pore diameter of 500 nm.

| | |
|---|---|
| Feed Temperature (° C.) | 120-130 |
| Feed Inlet Pressure (Bar) | 5-6 |
| Feed Velocity (m/s) | 3 |
| Pore Size (nm) | 500 |
| Avg. Flux (kg/m$^2$/hr) | 12-15 |
| Recovery (%) | 80 |
| Gasoline RI at 20° C. | 1.43323 |
| Kerosene RI at 20° C. | 1.44844 |
| Heavier RI at 20° C. | 1.46693 |

| | FEED | PERMEATE | RETENTATE |
|---|---|---|---|
| Ni (ppm) | 10.7 | 4.9 | 21 |
| V (ppm) | 40 | 19 | 76 |
| CCR (%) | 6.96 | 4.4 | 11.8 |
| Sulfur | 2.95 | 2.46 | 3.4 |
| RI | 1.51602 | 1.4975 | 1.53208 |

In Example 1, the permeate collected in first 8 hours has Refractive index ranging from 1.42921 to 1.43623 and the next streams collected at same interval has RI of 1.43816 to 1.44844, The last stream was rich in heavy hydrocarbons, hence the RI was ranging from 1.45863 to 1.46693.

In Example 2, the permeate collected in first 8 hours has Refractive index ranging from 1.42892 to 1.43723 and the next streams collected at same interval has RI of 1.43921 to 1.44844, The last stream was rich in heavy hydrocarbons, hence the RI was ranging from 1.45786 to 1.46693.

In Example 3, the permeate collected in first 8 hours has Refractive index ranging from 1.42987 to 1.44161 and the next streams collected at same interval has RI of 1.44316 to 1.45644, The last stream was rich in heavy hydrocarbons, hence the RI was ranging from 1.46163 to 1.48213.

In Example 4, the permeate collected in first 8 hours has Refractive index ranging from 1.42931 to 1.44265 and the next streams collected at same interval has RI of 1.44712 to 1.45327, The last stream was rich in heavy hydrocarbons, hence the RI was ranging from 1.46324 to 1.48713.

Whereas the principal inventive concept has been described in this provisional patent application, the invention will be fully and particularly described in the complete patent application pursuant hereto.

TECHNICAL ADVANTAGES OF THE INVENTION

The present invention has the following advantage over the prior arts:
1. Molecular separation of hydrocarbon feedstock
2. Removal of inorganic and organic contaminants from the hydrocarbon feedstock
3. Energy efficient process than conventional
4. Eco friendly process It will thus be seen that the objects set forth above, among those made apparent from the preceding description, are efficiently attained, and since certain changes may be made in the constructions set forth without departing from the spirit and scope of the invention, it is intended that all matter contained in the above description shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. These and other modifications of the preferred embodiments as well as other embodiments of the invention will be obvious from the disclosure herein, whereby the foregoing descriptive matter is to be interpreted merely as illustrative of the invention and not as a limitation.

Finally, to the extent necessary to understand or complete the disclosure of the present invention, all publications, patents, and patent applications mentioned herein are expressly incorporated by reference therein to the same extent as though each were individually so incorporated.

What is claimed is:

1. A process for molecular separation of a hydrocarbon feedstock, the process comprising:
    passing a stream of the hydrocarbon feedstock with/without a separation enhancing additive(s) through nanopore membranes to produce a permeate stream of lighter molecular hydrocarbon having a boiling point below 330° C. and a retentate stream of heavier molecular hydrocarbon having a boiling point above 550° C.;
    measuring the refractive indices of the permeate stream and the retentate stream and accordingly differentiating the permeate stream and the retentate stream with respect to their respective refractive indices;
    recovering the permeate stream that has 70-90% reduced asphaltenes, metals, sulfur, and Conradson Carbon Residue (CCR) compared to the hydrocarbon feedstock; and
    recycling the retentate stream having enriched impurities back for further purification;
    wherein the retentate stream has higher metals, sulfur and CCR as compared to the hydrocarbon feedstock and the process is characterized to remove inorganic and organic contaminants from the hydrocarbon feedstock in an energy-efficient and eco-friendly process.

2. The process as claimed in claim 1, wherein passing the stream of the hydrocarbon feedstock with/without a separation enhancing additive(s) through nanopore membranes to produce a permeate stream of lighter molecular hydrocarbon and a retentate stream of heavier molecular hydrocarbon comprises:
    adding the stream of hydrocarbon feedstock into a feed tank;
    pumping the stream of hydrocarbon feedstock to a membrane section by a pump via a feed line;
    heating the stream of hydrocarbon feedstock to an operating temperature by a heater to obtain a heated hydrocarbon feedstock;
    feeding the heated hydrocarbon feedstock to a membrane module, wherein the permeate stream permeates through a bottom side of the membrane module and goes to a permeate section and the retentate stream goes to a retentate section where the retentate stream goes to a heater to maintain the operating temperature and fed to a retentate tank, wherein the retentate stream is recycled back to the feed tank via a valve;

condensing the permeate stream in a condenser;

feeding the condensed permeate stream to a permeate tank;

cleaning the-nanopore membranes with the condensed permeate stream or with a fresh solvent;

monitoring a flow rate, a velocity and a density of the stream of the hydrocarbon feedstock by a flow indicator and a pressure by pressure indicators;

generating a high cross flow velocity at a high viscosity via the pump and controlling a flow rate of a recycling retentate stream via a control valve (36);

recovering the permeate stream that has 70-90% reduced asphaltenes, metals, sulfur, and the CCR compared to the stream of the hydrocarbon feedstock; and recycling the retentate stream having enriched impurities for further purification.

3. The process as claimed in claim 2, wherein a sampling point for characterization of the permeate stream and the retentate stream is provided at a bottom of the feed tank, the retentate tank, the permeate tank and the solvent tank.

4. The process as claimed in claim 1, wherein the stream of the hydrocarbon feedstock has an American Petroleum Institute (API) gravity from 10 to 50, an asphaltene content from 0.4 to 10%, a sulfur content from 0.05 to 5% and Nickel and Vanadium from 0.5 to 50 ppm level.

5. The process as claimed in claim 1, wherein the nanopore membranes have a pore size ranging from 50-200 nm.

6. The process as claimed in claim 1, wherein the separation enhancing additives are organic polyisocyanates containing aromatically bound isocyanate groups, wherein the organic polyisocyanates containing aromatically bound isocyanate groups are selected from the group consisting of 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4 toluene diisocyanate, 2,6-toluene diisocyanate, mixtures of 2,4- and 2,6-toluene diisocyanate, hexahydrotoluene diisocyanate, and mixtures thereof.

7. The process as claimed in claim 1, wherein the separation enhancing additives react with asphaltenes molecules, wherein the asphaltenes molecules have a kinetic diameter in a range of 15-50 nm.

8. The process as claimed in claim 1, wherein concentration of metals, sulfur, asphalt, Conradson Carbon residue and refractive index are reduced in the permeate stream by at least 30% of the hydrocarbon feedstock.

9. The process as claimed in claim 1, wherein the stream of the hydrocarbon feedstock has Reynolds number of at least 20000 inside the nanopore membranes.

10. The process as claimed in claim 1, wherein a transmembrane pressure across the nanopore membranes is at least 6 bar.

11. The process as claimed in claim 1, wherein the stream of the hydrocarbon feedstock has a temperature in a range from about 80 to about 300° C.

* * * * *